Patented Feb. 5, 1946

2,394,233

UNITED STATES PATENT OFFICE 2,394,233

COATING COMPOSITIONS

William L. Craig, Westport, Conn., assignor to R. T. Vanderbilt Company, Inc., New York, N. Y., a corporation of New York No Drawing. Application July 25, 1945, Serial No. 607,104

4 Claims. (Cl. 106—214)

This invention relates to fluid coating compositions adapted for the coating of fibrous sheet materials such as paper. More particularly the invention relates to fluid coating compositions of the type generally known in the art as coating colors. This application is in part a continuation of my application Serial No. 422,522, filed December 11, 1941, now Patent Number 2,388,526 of November 6, 1945.

Coating compositions of the type known as coating colors usually consist essentially of a mineral or pigment filler such as clay, titanium dioxide, calcium carbonate, barium sulphate, calcium sulphate, etc., plus a prepared adhesive, such as casein or starch. The finished coating composition may also contain such materials as defoaming agents, leveling agents, etc., and, if it is to be used to impart color to the fibrous sheet material, the coating composition may also include dyes or color pigments. In the preparation of coating colors of the type most generally used, it has been the practice to disperse the mineral or pigment in water by mechanical agitation and then mix the resulting composition with an adhesive which has previously been prepared separately. When casein is used as the adhesive, it is first mixed with water. An alkaline material such as soda ash, borax, trisodium phosphate, caustic soda or ammonia is then added and the resulting mixture is then heated to dissolve the casein. If a treated starch such as chlorinated gum is to be used as the adhesive, the starch is dispersed in water and heated to put the starch in colloidal solution. When an untreated starch such as raw corn starch, tapioca starch or potato starch is used, the starch adhesive is usually prepared by admixing the starch with water and then heating the mixture in the presence of an amylolytic enzyme to convert the starch into a mixture of usable viscosity. In the preparation of coating colors employing starch as the adhesive it has also been proposed to disperse a mixture of raw starch and the mineral or pigment filler in water, and then to heat this dispersion until the starch is gelatinized after which the resulting product is cooled and the resulting gel is then subjected to extremely vigorous agitation or grinding in order to mechanically break down the gel and obtain a product of usable viscosity.

However, all prior coating colors of which I am aware, if they employ a starch adhesive, are characterized by an unusually high viscosity in relationship to their total content of starch and filler. Thus prior coating colors employing starch as the adhesive usually have a viscosity so high as to make their application to paper by brush coating extremely difficult and sometimes impossible when the total content of starch plus filler exceeds about 25%. Similarly, if the total content of starch and filler substantially exceeds 40%, such color coatings, when prepared by the prior art methods, usually have a viscosity too high to permit their application to paper by any of the conventional machine coating methods. In many instances they are solid and exhibit no flow properties.

The coating colors of my invention employ a starch adhesive prepared from raw starch. However, they are characterized by an unusually low viscosity in relationship to their total content of starch and filler. Thus my novel coating colors have a viscosity not exceeding about 20,000 centipoises as measured by the standard Brookfield Synchro-lectric viscosimeter at 75° F. using a speed of 6 R. P. M., even with a total content of starch plus filler approximating 72%. They are therefore adapted to be applied to paper by conventional machine coating methods. With total contents of starch plus filler approximating 40%, the coating colors of my invention have a viscosity approximating 300 centipoises which is low enough to permit them to be applied readily to paper by brush coating. With total contents of starch plus filler ranging from as low as 25% to as high as 72%, the new coating colors of my invention have viscosities that represent only small fractions (approximately 10% or less) of the viscosities of prior coating compositions using starch as the adhesive and with equivalent total contents of starch plus filler. This extremely low viscosity, in relationship to total content of starch and filler, makes it possible to apply high coat weights in a single application. This greatly reduces the evaporative burden involved in drying. Moreover, papers coated with the coating colors of my invention have a higher gloss than papers coated with generally similar coating colors of the prior art.

In the usual coating colors when using starch as the adhesive, the ratio of starch to filler approximates 1:4 on the weight basis, although in extreme instances this ratio of starch to filler may be as low as about 15:100, or as high as about 35:100. The governing factor is that the proportion of starch used should be sufficient to bind the mineral or pigment filler to the fibrous sheet with sufficient tenacity to prevent "picking" during printing. These conventional ratios of starch to filler may be used satisfactorily in the improved coating compositions of my invention. The coating colors of my invention are prepared by forming an aqueous suspension of a mineral or pigment filler, incorporating a raw starch in the suspension and then subjecting the resulting mixture to the action of an amylolytic enzyme. By this procedure, the enzyme conversion of the starch is carried out in the presence of the mineral or pigment filler. The enzyme used in effecting the conversion of the starch is advantageously a liquefying enzyme as distinguished from a saccharifying enzyme, particularly a liquefying enzyme produced by bacterial fermentation having a high alpha amylase content and substantially free from beta amylase, insensitive to temperatures up to about 180° F. and active in alkaline media. The enzyme should have a liquefon (Analytical edition, Journal of Industrial and Engineering Chemistry, volume 7, pages 143–6, May 15, 1935) content of about 500–1200 per gram.

In preparing the new coating compositions of my invention, the desired proportions of mineral or pigment and raw starch are thoroughly mixed together in water and, when necessary, the pH of the mixture is adjusted to approximately neutral, advantageously within a pH range of from about 6.5 to 7.5, by the addition of a small amount of either of an alkaline material, such as borax, or an acid material, such as alum. A suitable amount of liquefying enzyme is then added and the mixture is heated to about 170° F. and held there until the starch is liquefied or until the enzyme converts the starch to the point where the viscosity of the mixture is reduced to the desired value. The enzyme is then inactivated or destroyed. This may be accomplished by raising the temperature to 200° F. and holding it there for about 10 minutes. The mixture may then be cooled.

My invention will be further illustrated by reference to the following examples, but my invention is not limited thereto.

Example I

A coating composition was prepared from the following materials in the proportions indicated, the proportions being given in parts by weight.

|  | Parts |
|---|---|
| Coating clay | 100 |
| Corn starch (raw) | 25 |
| Water | 53.5 |
| Sodium silicate | 1.25 |
| Tetrasodium pyrophosphate | 0.15 |
| Liquefying enzyme | 0.88 |

The tetrasodium pyrophosphate, used as an agent for dispersing the clay, and the sodium silicate, used to overcome the tendency of the clay to absorb protein, were dissolved in water. The dry clay was then added to the water and dispersed by mechanical agitation. The dry starch and the enzyme were then added to and dispersed in the mixture. The pH (Coleman) of the mixture was then checked and found to be about 7.5. The mixture was then heated to a temperature of 170° F.–175° F. in a cooking tank equipped with a mechanical agitator and held at this temperature for 30 minutes while continuing the agitation. The mixture was then heated to 200° F.–205° F. and held for 10 minutes to inactivate the enzyme, after which the mixture was cooled to room temperature and the viscosity measured. The viscosity determinations in this instance and in all other tests hereinafter described were made at 73° F. with a standard Brookfield Synchro-lectric viscosimeter, model L. V., using a speed of 6 R. P. M.

The coating color produced as just described had a content of starch and clay of 70% on the total composition, weight basis, and a viscosity of 18,600 centipoises. It flowed uniformly and smoothly. A portion of this coating color was applied to standard laboratory coating raw stock with a Bird film applicator. The thus coated paper after calendering was tested for coat weight, brightness, gloss, ink receptivity, and ability to resist "picking" by the Dennison wax test. It was found to have a coat weight of 27.6 (25×38—500), brightness 60.6, gloss 50.1, ink receptivity 5, and to be O.K. to #8 wax.

Example II

A coating composition was prepared from the following materials in the proportions indicated, the proportions being given in parts by weight.

|  | Parts |
|---|---|
| Coating clay | 100 |
| Corn starch (raw) | 25 |
| Water | 83.5 |
| Sodium silicate | 1.25 |
| Tetrasodium pyrophosphate | 0.15 |
| Liquefying enzyme | 0.63 |

The procedure employed was the same as that described in Example I. The coating color thus prepared had a content of starch and clay of 60% on the total composition and a viscosity of 6,000 centipoises.

Example III

A coating composition was prepared from the following materials in the proportions indicated, the proportions being given in parts by weight.

|  | Parts |
|---|---|
| Coating clay | 100 |
| Corn starch (raw) | 25 |
| Water | 187.5 |
| Sodium silicate | 1.25 |
| Tetrasodium pyrophosphate | 0.15 |
| Liquefying enzyme | 0.5 |

The procedure employed was the same as that described in connection with Example I. The coating color thus prepared had a content of starch and clay of 40% on the total composition and a viscosity of 310 centipoises.

Example IV

A coating composition was prepared from the following materials in the proportions indicated, the proportions being given in parts by weight.

|  | Parts |
|---|---|
| Coating clay | 100 |
| Corn starch (raw) | 25 |
| Water | 375 |
| Sodium silicate | 1.25 |
| Tetrasodium pyrophosphate | 0.15 |
| Liquefying enzyme | 0.5 |

The same procedure was used as that described in connection with Example I. The resulting coating color had a content of starch and clay of 25% on the total composition and a viscosity of 10 centipoises.

While coating compositions embodying my invention and in which the content of starch and filler varies from about 25% to about 72% on the total composition by weight are useful as coating colors, and have satisfactory pour properties, I prefer such coating compositions in which the content of starch and filler on the total composition varies from about 32% to about 65% by weight. Drying of papers coated with coating colors containing less than about 32% by weight of starch and filler on the total composition involves an increase in the evaporative burden that is not justified with the coating compositions of my invention except under unusual circumstances, as where a coated paper with a very light coat weight is desired for some special purpose. On the other hand, in the preparation of coating compositions containing upwards of about 65% of starch and filler on the total composition, initial dispersion of the filler and raw starch is difficult to obtain due to the limited amount of water.

I claim:

1. A fluid coating composition adapted for coating fibrous sheet materials consisting essentially of an aqueous suspension of particles of a filler from the group consisting of minerals and pigments and of an amylolyzed starch produced by the action of an amylolytic enzyme on raw starch in an aqueous dispersion of the raw starch and the filler, said coating composition containing from about 15 parts to about 35 parts of starch by weight for each 100 parts of filler and having a content of from about 25% to about 72% of starch and filler by weight on the total composition, said coating composition having a viscosity not exceeding about 20,000 centipoises at 73° F.

2. A fluid coating composition adapted for coating fibrous sheet materials consisting essentially of an aqueous suspension of particles of a filler from the group consisting of minerals and pigments and of an amylolyzed starch produced by the action of an amylolytic enzyme on raw starch in an aqueous dispersion of the raw starch and the filler, said coating composition containing from about 15 parts to about 35 parts of starch by weight for each 100 parts of filler and having a content of from about 32% to about 65% of starch and filler by weight on the total composition, said coating composition having a viscosity of less than about 20,000 centipoises at 73° F.

3. A fluid coating composition adapted for coating fibrous sheet materials consisting essentially of an aqueous suspension of particles of a filler from the group consisting of minerals and pigments and of an amylolyzed starch produced by the action of an amylolytic enzyme on raw starch in an aqueous dispersion of the raw starch and the filler, said coating composition containing from about 15 parts to about 35 parts of starch by weight for each 100 parts of filler and having a content of from about 60% to about 70% of starch and filler by weight on the total composition, said coating composition having a viscosity of less than about 20,000 centipoises at 73° F.

4. A fluid coating composition adapted for coating fibrous sheet materials consisting essentially of an aqueous suspension of particles of a filler from the group consisting of minerals and pigments and of an amylolyzed starch produced by the action of an amylolytic enzyme on raw starch in an aqueous dispersion of the raw starch and the filler, said coating composition containing approximately 25 parts of starch by weight for each 100 parts of filler and having a content of starch and filler approximating 40% by weight on the total composition, said coating composition having a viscosity low enough to permit its application to fibrous sheet materials by brush coating.

WILLIAM L. CRAIG.